This invention relates to cooking apparatus and more particularly to an improved oven door.

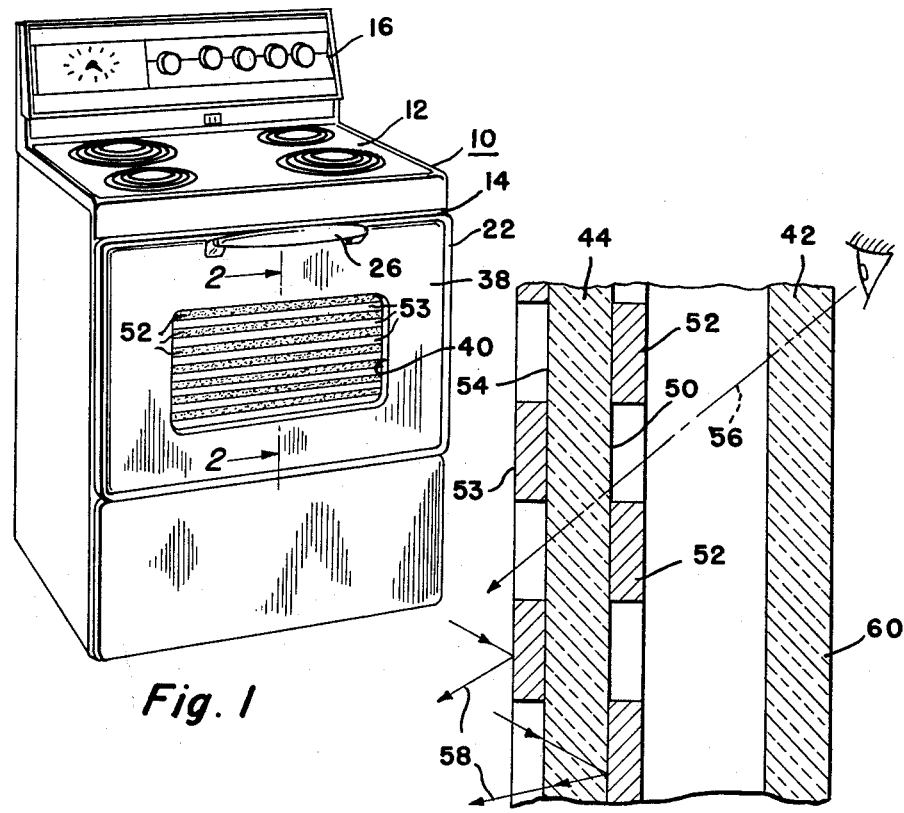
Fig. 1
Fig 3
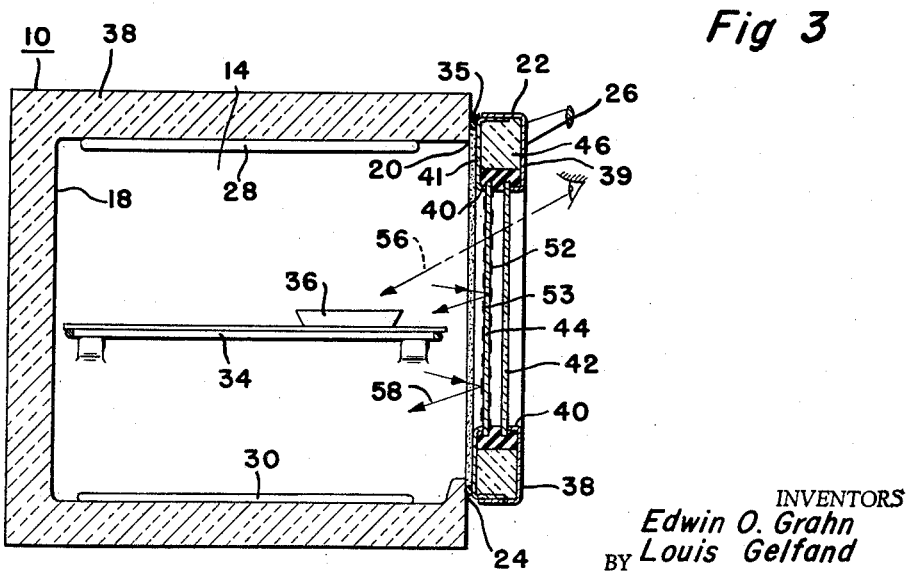
Fig. 2
INVENTORS
Edwin O. Grahn
Louis Gelfand
BY Frederick M. Ritchie
Their Attorney 3,088,453
DOMESTIC APPLIANCE
Edwin O. Grahn, Birmingham, and Louis Gelfand, Detroit, Mich., assignors to General Motors Corporation, Detroit, Mich., a corporation of Delaware
Filed Sept. 15, 1961, Ser. No. 138,498
5 Claims. (Cl. 126—273)

The prior art ranges are provided with oven doors having either a solid construction or a window for looking into the oven to observe the advance of a cooking process. The solid oven doors may use insulation between inner and outer door panels to minimize heat loss through the door. However, where a window is placed in the oven door, such insulation must be omitted from the glass area and this omission tends to increase heat loss to the extent that heat is radiated through the glass. Heat radiation disturbs the temperature distribution within the oven and thereby adversely affects baking results.

Accordingly it is an object of this invention to provide an oven with an improved oven door having a window for seeing into the oven.

It is also an object of this invention to provide an oven door with a patterned glass which will minimize heat radiation through the glass but which will provide adequate visibility of the interior of the oven.

More particularly, it is an object of this invention to provide an oven door window with spaced, staggered, reflective patterns on the glass to provide a visual path into the oven for food inspection while effectively blocking heat radiation from the oven.

Further objects and advantages of the present invention will be apparent from the following description, reference being had to the accompanying drawings wherein preferred embodiments of the present invention are clearly shown.

In the drawings:

FIGURE 1 is a perspective view of an electric range suitable for use with this invention;

FIGURE 2 is a schematic sectional view of an oven provided with the improved oven door of this invention as taken generally along line 2—2 in FIGURE 1; and FIGURE 3 is an enlarged fragmentary section of the oven door glass.

With reference to FIGURE 1 and in accordance with this invention an electric range 10 is illustrated. The range is provided with a cooking top 12, an oven compartment 14 and a control panel 16 for effecting control of both the surface cooking units and the oven heating elements. The oven compartment 14 is defined by a liner or casing 18 which has a front opening 20 and a door 22 hingedly connected along its bottom edge as at 24 to the oven casing and adapted to move between a horizontally disposed open position and a vertically disposed closed position. Handle means 26 may be provided for moving the door 22 between the open and closed positions. Within the oven liner 14 an upper broil heating element 28 and a lower bake heating element 30 may be positioned in any suitable manner. Suitable racks or support means 34 are slidably carried by side walls of the oven liner and serve to support a cooking utensil such as 36 within the oven. Conventional insulation 38 may be provided to surround the oven liner 14 as a means to minimize conducted heat transfer from the oven liner to the surrounding atmosphere.

A cooking process may be initiated by placing the pan 36 and its contained food into the oven compartment 14. With the energization of either or both of the heating elements 28 or 30 from the control panel 16 the cooking process will commence. With the prior art solid doors it has been necessary to open the oven door 22 in order to observe how the cooking procedure is proceeding and heat thereby escapes through the exposed opening. Other prior art range doors have been provided with windows to look into the oven compartment without facilitating the escape of the hot gases from the oven compartment. However, this latter arrangement has proven unsatisfactory since heat is radiated through the transparent glass to the outside surroundings and temperatures within the oven compartment 14 are generally lowered in the vicinity of the transparent door glass. This invention incorporates the advantages of a transparent window which permits observation of the oven interior along with means for selectively reflecting oven heat to prevent the transfer of such heat through the oven door.

Turning now to FIGURE 2 the oven door 22 of this invention is shown provided with a circumscribing frame 38 comprised of an outer door panel 39 and an inner door panel 41 in nested relationship. A seal 35 is interposed between the door and the casing to prevent the egress of heat from the oven. A central aperture 40 is formed in each panel 39, 41 to provide a window for see-through into the oven compartment 14. For the purpose of this invention the aperture 40 is closed by a pair of transparent panels 42, 44 of glass or other suitable transparent material—the panels being supported in spaced relationship to each other in a yieldable seal 46 carried by the door-frame 38. It should be understood that the space between the glass panels may be evacuated to insure further the heat insulating characteristics of the window.

In accordance with one concept of this invention the inner glass panel 44 is silvered on its two sides. Based on presently used techniques, a chrome metallization is preferable on the exposed sides of the glass panel 44. FIGURE 2 shows in a general way the two surfaces of the glass panel 44 metallized with the pattern staggered in such a way that a minimum of interference to viewing the contents of the oven results. Both the ordinary viewing level and refraction of the glass would, of course, be considered in locating the patterned surface on the opposite sides of the glass. More particularly, and with reference to FIGURE 3 the inner glass panel 44 is shown coated on its outer side 50 with spaced horizontal bars 52 of a form of metallizing such as an aluminium coating or a chrome coating. This coating is placed on the glass by a vacuum plating process in the usual way with a screen placed in contact with the glass to intercept part of the metallized deposit. Of course it should be understood that any manner of placing the reflective surfaces on the glass would be suitable for the purposes of this invention. Then on the opposite side 54 of the inner glass panel 44 similar metallized bars 53 are plated to the glass in a manner to fill the gap or void formed between the front bars 52 by the spacing thereof. In this way a pair of spaced and staggered patterns is formed whereby a line of vision shown by the arrow 56 is defined to permit the operator to see the cooking utensil 36 residing in the oven liner. At the same time the staggered relationship of the reflective bars serve to return the radiant heat to the oven liner or compartment as shown at 58 in FIGURE 2 and FIGURE 3.

As an alternate construction to that described hereinbefore the metallized surfaces 52, 53 might be placed between the glass panels, i.e. on the inside 60 of the outer glass panel 42 and the outside 50 of the inner glass panel 44. In this way the metallizing would be in an inaccessible area free from the abrasive effects of the various window cleaning procedures.

It should now be seen that an improved oven door has been provided wherein a look-through window is provided with two partly metallized surfaces in spaced, staggered relationship to one another, thereby to increase the reflection of the radiated heat rays without disturbing the line of vision into the oven. Such an arrangement will appreciably reduce the heat loss from the oven while facilitating the cooking operation by permitting observation of the cooking at all times.

While the embodiments of the present invention as herein disclosed, constitute preferred forms, it is to be understood that other forms might be adopted.

What is claimed is as follows:

1. In combination, casing means defining an oven having a front opening through which food may be loaded and unloaded and enclosing a heating element for cooking food, means for supporting food in said oven, and a door for closing said opening, said door comprising a frame sealingly selectively engageable with said casing and having a central aperture adjacent said supporting means for visibly exposing food in said oven, a first transparent glass panel carried by said frame and closing said aperture, a second glass panel spaced from said first glass panel and carried by said frame, said second glass panel having a first reflective metallized bar pattern vacuum plated on one side thereof and a second reflective metallized bar pattern on the other side thereof offset from said first metallized pattern by the width of said first metallized pattern, said second glass panel providing an oblique path of vision through the thickness thereof between the first and second reflective metallized bar patterns from the outside of said oven to the supporting means whereby the heat from food on said supporting means and the heat from said heating element is reflected by said patterns back into said oven.

2. In combination, casing means defining a compartment having a front opening through which heated food may be unloaded, means for supporting heated food in said compartment, and a door for closing said opening, said door comprising a frame sealingly selectively engageable with said casing and having a central aperture adjacent said supporting means for visibly exposing food in said compartment, a first transparent glass panel carried by said frame and closing said aperture, a second glass panel spaced from said first glass panel and carried by said frame, said second glass panel having a first reflective metallized bar pattern vacuum plated on one side thereof and a second reflective metallized bar pattern on the other side thereof offset from said first metallized pattern by the width of said first metallized pattern, said second glass panel providing an oblique path of vision through the thickness thereof between the first and second reflective metallized bar patterns from the outside of said compartment to the supporting means whereby heat from food on said supporting means is reflected by said patterns back into said compartment.

3. An oven door comprising a frame having a central aperture for visibly exposing the interior of an oven, a first transparent glass panel carried by said frame and closing said aperture, a second transparent glass panel spaced from said first glass panel and carried by said frame, said second glass panel having a first reflective metallized bar pattern vacuum plated on one side thereof between said panels and a second reflective metallized bar pattern on the other side thereof offset from said first metallized pattern by the width of said first metallized pattern, said second glass panel providing an oblique path of vision from a point transversely offset from said first and second reflective metallized bar patterns through the thickness of said second glass panel and between the first and second reflective metallized bar patterns from one side of said frame to the other side thereof whereby heat on said other side of said frame is reflected by said patterns.

4. An oven door comprising a frame having a central aperture for visibly exposing the interior of an oven, a first transparent panel carried by said frame and closing said aperture, a second transparent panel spaced from said first panel and carried by said frame, said second panel having a first reflective metallized bar pattern vacuum plated on one side thereof and a second reflective metallized bar pattern on the other side thereof offset from said first metallized pattern by substantially the width of said first metallized pattern, said second panel providing an oblique path of vision through the thickness of said second panel between the first and second reflective metallized bar patterns from one side of said frame to the other side thereof whereby heat on said other side of said frame is reflected by said patterns.

5. An oven door comprising a frame having a central aperture for visibly exposing the interior of an oven, a first transparent panel carried by said frame and closing said aperture, a second transparent panel coextensive with and spaced from said first panel and carried by said frame to form a closed and protected chamber between said panels, a first reflective bar pattern on one side of said second panel in said closed and protected chamber, a second reflective bar pattern on one of said panels offset from said first pattern by substantially the width of said first pattern, said panels providing an oblique path of vision through the thickness thereof and between the first and second reflective bar patterns from one side of said frame to the other side thereof whereby heat on said other side of said frame is reflected by said patterns.

References Cited in the file of this patent

UNITED STATES PATENTS

| | | |
|---|---|---|
| 1,717,636 | Vastine | June 18, 1929 |
| 2,325,773 | Hennessy | Aug. 3, 1943 |
| 2,874,611 | Luboshez | Feb. 24, 1959 |
| 2,980,567 | Steel | Apr. 18, 1961 |